No. 860,091. PATENTED JULY 16, 1907.
R. HOHNBACH.
MIXING MACHINE.
APPLICATION FILED DEC. 15, 1906.

Witnesses
Inventor
Robert Hohnbach

UNITED STATES PATENT OFFICE.

ROBERT HOHNBACH, OF JOLIET, ILLINOIS.

MIXING-MACHINE.

No. 860,091.  Specification of Letters Patent.  Patented July 16, 1907.

Application filed December 15, 1906. Serial No. 347,959.

*To all whom it may concern:*

Be it known that ROBERT HOHNBACH, a citizen of the United States, residing at Joliet, in the county of Will and State of Illinois, has invented certain new and useful Improvements in Mixing - Machines, of which the following is a specification.

This invention has relation to machines for mixing dough, and other materials of like consistency and has for its principal object, the provision of novel means for imparting slow rotary movement to the agitator or mixing spoon operating within a mixing tank, from a generator of comparatively high speed by means of a directly connected speed reducer without the use of gearing, belts, or like devices.

A further object of my invention is to provide novel means for tilting the mixing tank from an upright position to a position in which the contents may be discharged and vice versa and for automatically stopping and locking the tank at the point where it is desired to stop it.

My invention consists in the construction, combination and arrangement of mechanisms hereinafter specifically described and claimed.

Figure 1:
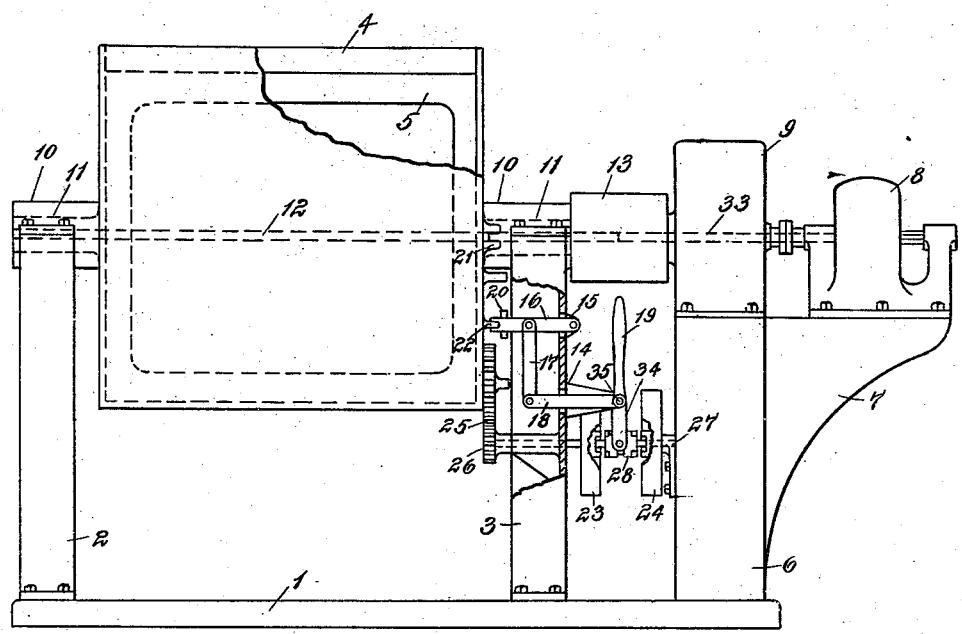
Figure 2:
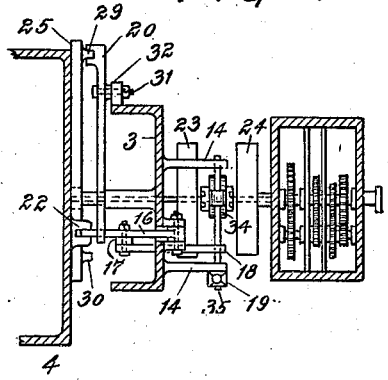
Figure 3:
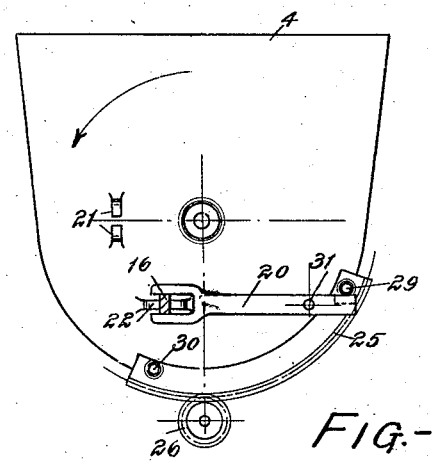

In the accompanying drawings: Figure 1, is a side elevation of the mixing machine. Fig. 2, is a horizontal section illustrating part of the machinery taken on the line X—X of Fig. 1. Fig. 3, is an end view of the tank.

In the drawings 1, is a base plate to which are bolted the two "A" frames 2 and 3, supporting the journal boxes 10.

4, Fig. 1 and Fig. 3, is the mixing tank having trunnions 11 cast at its ends which journal in 10, and furnish a means for tilting the tank.

5, Fig. 1, is the mixing spoon or agitator, keyed to shaft 12 and journaling in trunnions 11.

9, Fig. 1, is any speed reduction device which reduces the speed of the motor 8 to which it is directly connected, by means of a coupling.

6, Fig. 1 and Fig. 2, is a stand which supports said reduction device and also the motor, the motor support 7, being cast in one with 6.

13, Fig. 1, is a driving pulley which operates clutch pulleys 23 and 24, and also furnishes a means for connecting shaft 12 to shaft 33 of reduction device in 9.

14, Fig. 1 and Fig. 2, is a bracket cast in one piece with 3, which supports, and in which journals shaft 35. To the latter is keyed fork 34, hand lever 19 and lever 18. To one end of lever 18 is bolted lever 17, which in turn is bolted to lever 16, held in place by a pin through lug 15, cast in one with 3.

28 is a clutch feathering on shaft 27, to which is keyed pinion 26, which engages gear segment 25 securely fastened to tank. Shaft 27 also carries 2 loose clutch pulleys, which are operated from drive pulley 13, by means of one straight and one quarter twist belt, thus rotating 23 and 24 in opposite directions.

21 and 22, Figs. 1, 2, and 3, are lugs cast on the end of tank 4, to engage lever 16, and thus hold or lock tank to prevent the same from tilting when pulleys 23 and 24 are disengaged.

20, Fig. 1, 2, and 3, is a lever to automatically stop the tank in the desired upright or horizontal position; it is held in place by lug 32 cast on standard 3, and pin 31, and has a forked end to engage lever 16.

29 and 30 are studs or projections cast on segment 25, which operate the lever 20, which in turn through the system of levers 16, 17 and 18 disengages clutch 28.

The operation is briefly as follows: The rotation of the agitator by the motor being obvious and clutch pulley 23 being in engagement with the clutch 28, lever 16 passes out of the slot 22 and the tank rotates in the direction indicated by the arrow as shown in Fig. 3, thus bringing stud 30 in contact with lever 20; by this time lug 21 occupies the former position of lug 22 and when stud 30 strikes lever 20, the latter will not only force lever 16 into slot 21, thus locking the tank, but will also disengage the clutch 28 thus stopping the pinion 26 from rotating. In a similar way, the tank is automatically stopped in a vertical position by 29.

What I claim and desire to secure by Letters Patent is:

1. In a mixing machine, the combination with a tiltable mixing tank, and a rotary agitator arranged therein, and adapted to rotate independently thereof of a rotary electric motor from which said agitator is driven, axially alined with the shaft of said agitator, a speed reducer interposed between the shafts of the motor and agitator and means for tilting the tank operated from the motor.

2. In a mixing machine the combination with a trunnioned, trough-shaped tank, a horizontally arranged agitator in said tank and a shaft to which said agitator is attached passing through one end of said tank, of means for tilting said tank, in opposite directions and for automatically stopping said tank at desired points.

3. In a mixing machine the combination with a tiltable mixing tank and a rotary agitator in said tank, having an exteriorly projecting horizontal shaft, of a drive pulley mounted on said shaft, right and left clutch pulleys connected to said drive pulley by belts, a horizontal shaft on which said clutch pulleys are loosely mounted, a clutch splined on said horizontal shaft, a clutch operating lever, stops formed on one end of the tank and means connected respectively to the clutch pulley shaft and the clutch lever, whereby the tank may be tilted in either direction and automatically stopped at desired points.

4. In a mixing machine the combination with the horizontally arranged tiltable tank 4, rotary agitator 5, agitator shaft 12, and drive pulley 13, of the right and left clutch pulleys 23, 24, clutch 28, clutch lever 19, shaft 27, 110 pinion 26, toothed segment 25, carrying stops 29, 30, levers 16, 20, and connections between the clutch lever and lever 16, substantially as described.

In testimony whereof I affix my signature, in presence of two witnesses.

ROBERT HOHNBACH.

Witnesses:
STEPHEN A. GOODSPEED,
JOHN M. WOLFRUM.